United States Patent Office 3,565,511
Patented Feb. 23, 1971

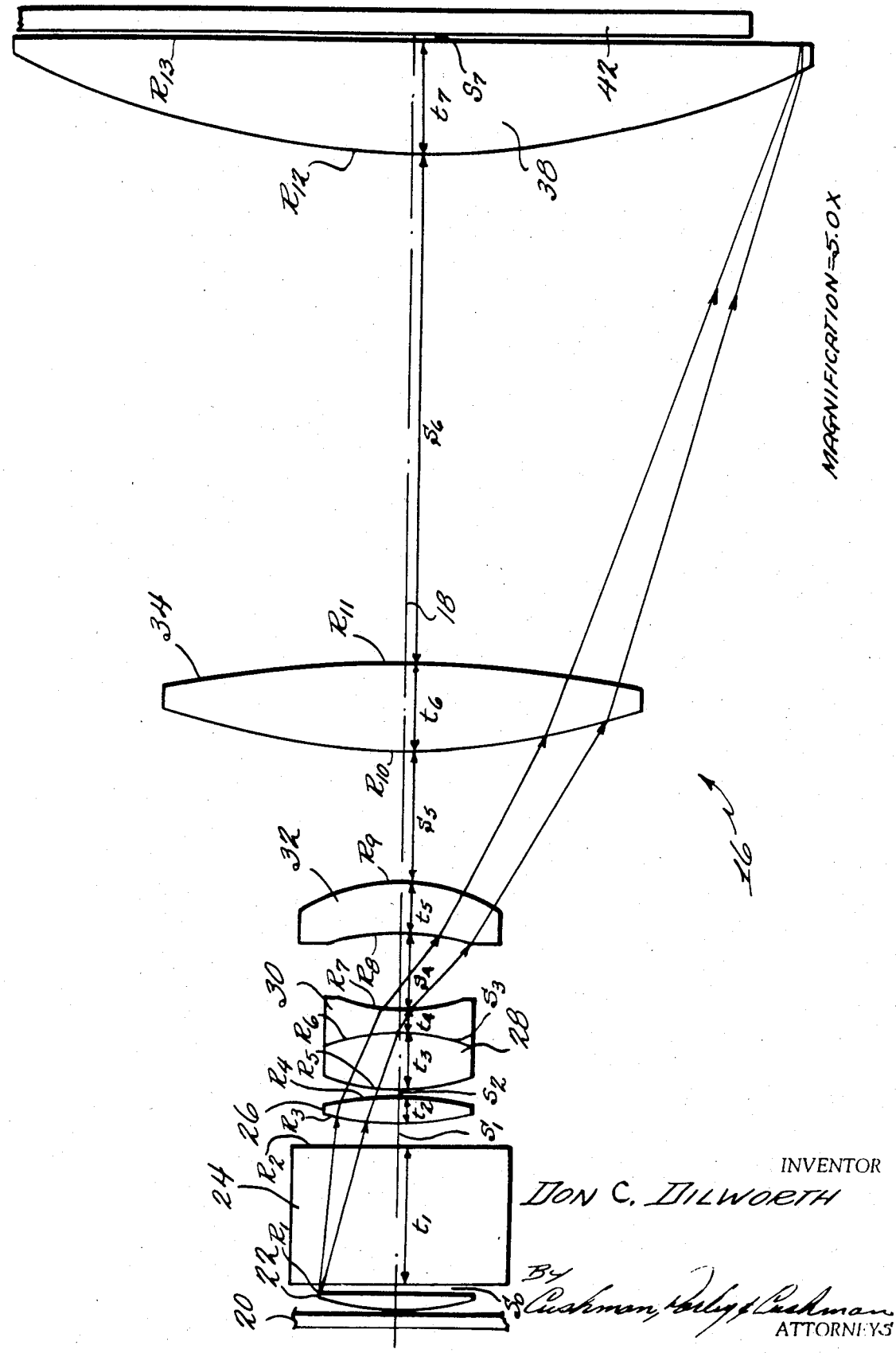

3,565,511
TELECENTRIC LENS SYSTEM FOR PROVIDING AN IMAGE WITH THE PRINCIPAL RAYS PARALLEL TO THE OPTICAL AXIS AND NORMAL TO THE FOCAL PLANE
Donald C. Dilworth, New Orleans, La., assignor to Baus Optics, Inc., New Orleans, La., a corporation of Louisiana
Filed Apr. 23, 1969, Ser. No. 818,487
Int. Cl. G02b 9/64, 13/22
U.S. Cl. 350—176  7 Claims

ABSTRACT OF THE DISCLOSURE

A lens system which magnifies an incident image five times and causes the light leaving the lens system to be substantially parallel so as to permit perpendicular impingement upon a device such as a plane matrix situated at the focal plane of the lens system.

BRIEF DESCRIPTION OF THE PRIOR ART AND SUMMARY OF THE INVENTION

The invention relates to a lens system which is capable of magnifying an image five times and at the same time causing the light rays exiting from the system as the magnified image to be substantially parallel with the other rays and perpendicular to a focal plane.

There are a number of optical applications in which it is desirable to magnify an image and at the same time insure that the light leaving the lens system as that magnified image is substantially parallel and perpendicular to some plane, for example, the focal plane of the system. This requirement is particularly present when the image is to be impinged upon a matrix of phototransistors or like elements, since such devices are usually sensitive to the angle to which the light enters the phototransistor. If such a transistor is being used to indicate an on or off conditon in response to a given threshold value of impinging light, any variation in entrant angle may severely effect the actual threshold value and thus cause whatever logical or other apparatus attached to the matrix to respond or not to respond incorrectly.

Thus, it is important that the light which impinges upon such phototransistors or like elements enter at substantially 90° to the phototransistor or like device. Unfortunately, conventional lens arrangements while capable of performing the magnification which is frequently necessary with such an arrangement, also unfortunately may produce a diverging image which will not enter exactly perpendicularly for some of the transistors and the entrant angle will vary over the matrix with the undesirable results described briefly above. In the present invention, this problem is solved by a simple arrangement of optical elements, which not only performs the five fold magnification required, but also produces a magnified image comprised of substantially parallel light so that if a photo-transistor matrix or similar device is placed at the focal plane of the system as described below, the light will enter each and every photo-transistor at substantially 90° to that phototransistor and problems attendant upon non-parallel entrance are substantially eliminated.

The exact unique configuration for performing this function is described in detail below and is comprised of a plurality of simple lenses of the described type and arrangement which operated to magnify the image to the desired size and also to render the light parallel. Many other objects and purposes of the invention will become clear from reading the following detailed description of the drawing.

BRIEF DESCRIPTION OF THE DRAWING

The figure shows a lens arrangement together with a photodetector matrix.

DETAILED DESCRIPTION OF THE DRAWING

Reference is now made to FIG. 1 which shows the unique combination of lens elements 16 which results in the novel capability of this system, as discussed above, to magnify an incident image transmitted through the combination 16 along an optical axis 18 five times, while at the same time rendering the light comprising that magnified output image substantially parallel.

The incident image, which may come from any suitable source and may be of any suitable size such as to be magnified by the lenses shown, is first incident upon a first cylindrical lens 20 through which it passes to a second cylindrical lens 22 which is disposed with its axis at a substantially right angle to the lens 20. Next, the image travels from lens 22 a distance $S_0$ to a prism 24 of thickness $t_1$ and through it to a biconvex lens 26 separated from the surface $R_2$ of prism 24 by distance $S_1$. Lens 26 has a surface $R_3$ through which the light enters, a thickness $t_2$ an a surface $R_4$ through which the light exits. The light exiting from surface $R_3$ travels a distance $S_2$ and next passes through another biconvex lens 28 having surfaces $R_5$ and $R_6$ and a thickness $t_3$ to a biconcave lens 30 having surfaces $R_6$ and $R_7$ and thickness $t_4$. Lens 30 is separated from lens 28 by a distance $S_3$ as shown which is virtually zero so that lenses 30 and 28 are in contact. Next, the light exiting from lens 30 travels distance $S_4$ to concavo-convex lens 32 having concave surface $R_8$ and convex surface $R_9$, as well as a thickness $t_5$. Finally, the light travels a distance $S_5$ to a convex lens 34 having surfaces $R_{10}$ and $R_{11}$ and thickness $t_6$ and then through a lens 38 with surfaces $R_{12}$ and $R_{13}$ and thickness $t_7$ to a diode photo-transistor or photodetector matrix 42 disposed at the focal plane of the system and separated from surface $R_{13}$ by distance $S_7$.

It will of course be appreciated that the unique advantages of this system have been achieved by a judicious combination of lens parameters and arrangements chosen by computation and experimentation. It will further be appreciated that for any given constructed system, the values given below, which represent what is believed to be the optimum values, may be varied slightly to compensate for imperfect lenses or for any other reason. Moreover, it is not the exact sizes and physical distances which result in the advantages of this system but rather the relation of the sizes, characteristics and separations of the various lenses comprising the system which produces the novel results. Accordingly, it should be apparent that such sizes, characteristics and separations can be easily varied provided that each lens is varied proportional to each other lens with their relation to each other remaining the same. The following Table I gives the thicknesses and separations of the lenses in inches for one constructed embodiment measured along the optical axis 18. These values can be multiplied by any number, integer or non-integer.

| | |
|---|---|
| $S_0 = .030$ | $t_1 = .400$ |
| $S_1 = .070$ | $t_2 = .075$ |
| $S_2 = .002$ | $t_3 = .175$ |
| $S_3 = .000$ | $t_4 = .068$ |
| $S_4 = .219$ | $t_5 = .142$ |
| $S_5 = .377$ | $t_6 = .253$ |
| $S_6 = 2.154$ | $t_7 = .315$ |
| $S_7 = .010 \pm .002$ | |

Moreover the lenses in the embodiment constructed had radii of curvature and diameters expressed in inches as follows in Table II with concave surfaces designated by a minus (−) sign:

TABLE II $R_1 = \infty$ (Diameter Lens 26 = 0.447)
$R_2 = \infty$ (Diameter Lens 28 = 0.447)
$R_3 = 1.148$ (Diameter Lens 30 = 0.447)
$R_4 = -0.256$ (Diameter Lens 32 = 0.600)
$R_5 = 0.444$ (Diameter Lens 34 = 1.400)
$R_6 = -0.598$ (Diameter Lens 38 = 2.425)
$R_7 = 0.488$
$R_8 = -0.810$
$R_9 = -0.545$
$R_{10} = 2.130$
$R_{11} = -3.505$
$R_{12} = 3.015$
$R_{13} = \infty$ Even further the glasses in the lenses in the constructed embodiment had indexes of refraction, Abbe numbers (absolute values), clear apertures and glasses as follows in Tables III, IV, V and VI:

TABLE III.—$N_d$

| | $N_d$ |
|---|---|
| Prism 24 | 1.62374 |
| Lens 26 | 1.85026 |
| Lens 28 | 1.72000 |
| Lens 30 | 1.76180 |
| Lens 32 | 1.85026 |
| Lens 34 | 1.57250 |
| Lens 38 | 1.62374 |

TABLE IV.—$V_d$

| | $V_d$ |
|---|---|
| Prism 24 | 47.00 |
| Lens 26 | 32.23 |
| Lens 28 | 50.41 |
| Lens 30 | 26.95 |
| Lens 32 | 32.23 |
| Lens 34 | 57.55 |
| Lens 38 | 47.00 |

TABLE V.—Clearance App.

| | Cl. Ap. |
|---|---|
| Lens 26: | |
| Surface $R_3$ | 0.374 |
| Surface $R_4$ | 0.362 |
| Lens 28: | |
| Surface $R_5$ | 0.309 |
| Surface $R_6$ | 0.177 |
| Lens 30: | |
| Surface $R_6$ | 0.177 |
| Surface $R_7$ | 0.107 |
| Lens 32: | |
| Surface $R_8$ | 0.420 |
| Surface $R_9$ | 0.538 |
| Lens 34: | |
| Surface $R_{10}$ | 1.200 |
| Surface $R_{11}$ | 1.250 |
| Lens 38: | |
| Surface $R_{12}$ | 2.360 |
| Surface $R_{13}$ | 2.360 |

TABLE VI.—Glass

| | |
|---|---|
| Prism 24 | BAK-1 |
| Lens 26 | BAF-8 |
| Lens 28 | BAF-8 |
| Lens 30 | LASF-9 |
| Lens 32 | LAK-10 |
| Lens 34 | SF-55 |
| Lens 38 | LASF-9 |

Many modifications and changes of the above embodiment can of course be made without departing from the spirit of the invention and accordingly the scope of the invention is intended to be limited only by the scope of the appended claims.

What is claimed is:

1. An optical system which is telecentric on the image side with the principal rays parallel to the optical axis and normal to the focal plane for magnifying an entrant image five times comprising:
   a prism for receiving the entrant image and having a thickness $t_1$ along the optical axis,
   a first lens disposed rearwardly of said prism having a thickness $t_2$ along the optical axis, a first convex surface $R_3$ facing and separated from said prism by a distance $S_1$ along the optical axis and a second convex surface $R_4$.
   a second lens disposed rearwardly of said first lens having a thickness $t_3$ along the optical axis, a first convex surface $R_5$ facing said surface $R_4$ and separated from said surface $R_4$ by a distance $S_2$ along the optical axis and a second convex surface $R_6$,
   a third lens disposed rearwardly of said second lens having a thickness $t_4$ along the optical axis, a first concave surface $R_6'$ in contact with said surface $R_6$ and a second concave surface $R_7$,
   a fourth lens disposed rearwardly of said third lens having a thickness $t_5$ along the optical axis, a first concave surafce $R_8$ facing said surface $R_7$ and separated from said surface $R_7$ by a distance $S_4$ along the optical axis, and a second convex surface $R_9$,
   a fifth lens disposed rearwardly of said fourth lens having a thickness $t_6$, a first convex surface $R_{10}$ facing and separated from said surface $R_9$ by a distance $S_5$ along the optical axis and a second convex surface $R_{11}$,
   a sixth lens disposed rearwardly of said fifth lens having a thickness $t_7$, a first convex surface $R_{12}$ facing and separated from said surface $R_{11}$ by a distance $S_6$ along the optical axis, and a second flat surface $R_{13}$, and
   the relative values of the thicknesses and distances with respect to the other thicknesses and distances being approximately

| | |
|---|---|
| $t_1 = 0.400$ | $S_1 = .070$ |
| $t_2 = 0.075$ | $S_2 = .002$ |
| $t_3 = 0.175$ | $S_4 = 0.219$ |
| $t_4 = 0.068$ | $S_5 = 0.377$ |
| $t_5 = 0.142$ | $S_6 = 2.154$ |
| $t_6 = 0.253$ | |
| $t_7 = 0.315$ | |

2. A system as in claim 1 wherein:
   said prism has an absolute refraction index of approximately 1.62374, and an absolute Abbe number of approximately 47.00,
   said first lens has an absolute refraction index of approximately 1.85026, an absolute Abbe number of approximately 32.23, and a diameter of approximately 0.447,
   said second lens has an absolute refraction index of approximately 1.72000, an absolute Abbe number of approximately 50.41 and a diameter of approximately 0.447, said third lens has an absolute refraction index of approximately 1.76180, an absolute Abbe number of approximately 26.95 and a diameter of approximately 0.447, said fourth lens has an absolute refraction index of approximately 1.85026, an absolute Abbe number of approximately 32.23 and a diameter of approximately 0.600, said fifth lens has an absolute refraction index of approximately 1.57250, an absolute Abbe number of approximately 57.55 and a diameter of approximately 1.400, said sixth lens has an absolute refraction index of approximately 1.62374, an absolute Abbe number of approximately 47.00 and a diameter of approximately 2.425, and the values of said diameters are relative to each other.

3. A system as in claim 2 wherein
said prism is comprised of glass BAF–8,
said first lens is comprised of glass LASF–9,
said second lens is comprised of glass LAK–10,
said third lens is comprised of glass SF–55,
said fourth lens is comprised of glass LASF–9,
said fifth lens is comprised of glass BAK–1, and
said sixth lens is comprised of glass BAF–8.

4. A system as in claim 1 wherein:
said surface $R_1$ has a radius of curvature of approximately infinity,
said surface $R_2$ has a radius of curvature of approximately infinity,
said surface $R_3$ has a radius of curvature of approximately 1.148 and a clear aperture of approximately 0.374,
said surface $R_4$ has a radius of curvature of approximately −0.256 and a clear aperture of approximately 0.362,
said surface $R_5$ has a radius of curvature of approximately 0.444 and a clear aperture of approximately 0.309,
said surface $R_6$ has a radius of curvature of approximately −0.598 and a clear aperture of approximately 0.177,
said surface $R_7$ has a radius of curvature of approximately 0.488 and a clear aperture of approximately 0.107,
said surface $R_8$ has a radius of curvature of approximately −0.810 and a clear aperture of approximately 0.420,
said surface $R_9$ has a radius of curvature of approximately −0.545 and a clear aperture of approximately 0.538,
said surface $R_{10}$ has a radius of curvature of approximately 2.130 and a clear aperture of approximately 1.200,
said surface $R_{11}$ has a radius of curvature of approximately −3.505 and a clear aperture of approximately 1.250,
said surface $R_{12}$ has a radius of curvature of approximately 3.015 and a clear aperture of approximately 2.360,
said surface $R_{13}$ has a radius of curvature of approximately infinity and a clear aperture of approximately 2.360, and said minus (−) values of radii of curvature indicate a concave surface and said values of radii of curvature and clear apertures are relative to the other values of radii and clear aperture respectively.

5. A system as in claim 1 including a matrix of light sensitive devices disposed to receive said magnified image comprised of substantially parallel light.

6. A system as in claim 5 wherein said matrix is located approximately on the focal plane of the system.

7. A system as in claim 1 further including a first cylindrical lens, a second cylindrical lens disposed rearwardly of said first cylindrical lens with its axis substantially perpendicular to the axis of said first cylindrical lens, said first and second cylindrical lenses being disposed so as to receive said entrant image and pass said entrant image to said prism and said second cylindrical lens being separated by a distance of approximately 0.3 along the optical axis from said prism relative to the values of separation and thickness of the other lenses and prism.

References Cited

UNITED STATES PATENTS

| | | | |
|---|---|---|---|
| 2,651,970 | 9/1953 | Tiller | 350—(175TS)UX |
| 2,685,229 | 8/1954 | Schulz et al. | 350—(175TS)UX |
| 3,278,752 | 10/1966 | Brixner | 350—205X |

JOHN K. CORBIN, Primary Examiner

U.S. Cl. X.R.

350—190, 204, 205, 212, 214